(12) United States Patent
Rey et al.

(10) Patent No.: US 7,957,738 B2
(45) Date of Patent: Jun. 7, 2011

(54) ADAPTIVE AND SCALABLE QOS ARCHITECTURE FOR MULTI-BEARER MULTICAST/BROADCAST SERVICES

(75) Inventors: Jose Luis Rey, Darmstadt (DE); Ivica Rimac, Darmstadt (DE); Rolf Hakenberg, Darmstadt (DE)

(73) Assignee: Panasonic Corporation, Osaka (JP)

(*) Notice: Subject to any disclaimer, the term of this patent is extended or adjusted under 35 U.S.C. 154(b) by 779 days.

(21) Appl. No.: 11/630,027

(22) PCT Filed: Jun. 17, 2005

(86) PCT No.: PCT/EP2005/006567
§ 371 (c)(1),
(2), (4) Date: Feb. 19, 2008

(87) PCT Pub. No.: WO2005/125095
PCT Pub. Date: Dec. 29, 2005

(65) Prior Publication Data
US 2008/0293428 A1    Nov. 27, 2008

(30) Foreign Application Priority Data
Jun. 21, 2004 (EP) .................................... 04014494

(51) Int. Cl.
*H04W 4/00* (2009.01)

(52) U.S. Cl. .................. 455/435.1; 455/452.2; 370/390; 370/432

(58) Field of Classification Search .................. None
See application file for complete search history.

(56) References Cited

U.S. PATENT DOCUMENTS

| | | | |
|---|---|---|---|
| 2006/0166653 A1* | 7/2006 | Xu et al. ..................... | 455/412.2 |
| 2007/0197235 A1* | 8/2007 | Zhang ........................... | 455/466 |
| 2007/0243821 A1* | 10/2007 | Hundscheidt et al. ....... | 455/3.04 |
| 2009/0067359 A1* | 3/2009 | Mademann .................. | 370/312 |
| 2009/0190519 A1* | 7/2009 | Lee et al. ..................... | 370/312 |
| 2010/0014479 A1* | 1/2010 | Kim ............................. | 370/329 |

(Continued)

FOREIGN PATENT DOCUMENTS
EP       1331785       7/2003

(Continued)

OTHER PUBLICATIONS
PCT International Search Report dated Aug. 9, 2005.

(Continued)

*Primary Examiner* — Ajit Patel
(74) *Attorney, Agent, or Firm* — Dickinson Wright PLLC

(57) ABSTRACT

The invention relates to a method for filtering and a network entity of the core network or the radio access network of a mobile communication system filtering streams belonging to a single user service. The packet streams, each being transported by a bearer service, provide a multicast or broadcast service and is delivered from a service center via the network entity to a mobile terminal. The network entity comprises a service manager providing a quality-of-service management function. The invention further relates to a communication system comprising the network entity. To provide an adaptive multimedia broadcast/multicast service QoS architecture that is scalable to a great number of users, the invention suggests providing the service in form of a packet streams, each being provided via a single bearer service, and equipping nodes within the distribution tree of the service filter capability allowing to (de)register bearer services providing the service based on the downlink quality-of-service constraints obtained from a service manager.

21 Claims, 10 Drawing Sheets

U.S. PATENT DOCUMENTS

2010/0142429 A1* 6/2010 Yi et al. .................. 370/312

FOREIGN PATENT DOCUMENTS

| EP | 1437901 | 7/2004 |
|---|---|---|
| WO | 03019860 | 3/2003 |

OTHER PUBLICATIONS

3GPP technical specification group services and system aspects: "TR 23.846 v6.1.0: Multimedia Broadcast/Multicast Service (MBMS); Architecture and functional description," online, Dec. 2002, XP002302176, retrieved from the internet: URL:http://www.3gpp.org> p. 9, line 11-p. 12, line 12; figure 1, p. 27, line 1-p. 31, line 12, annex A, p. 71, line 1-p. 93, line 9.

3GPP technical specification group services and system aspects: "TS 23.246 v6.2.0: Multimedia Broadcast/Multicast Service (MBMS); Architectural and functional description1" online, Mar. 2004, XP002302177, retrieved from the internet: URL:http://www.3gpp.org>, p. 15, line 8-p. 37, line 21.

3GPP technical specification group services and system aspects: "TS 23.107 v6.1.0: Quality of Service (QoS) concept and architecture," online, Mar. 2004, XP002302178, retrieved from the internet: URL:http://www.3gpp.org>, p. 7, line 32-p. 8, line 34, p. 11, line 32-p. 30, line 1, p. 34, line 1-line 10.

S. Blake, et al.; "An Architecture for Differentiated Services," RFC 2475, Dec. 1998, pp. 1-36.

R. Braden, et al.: "Resource ReSerVation Protocol (RSVP)," Version 1 Message Processing Rules, RFC 2209, Sep. 1997, pp. 1-25.

R. Hancock, et al.; "Next Steps in Signaling: Framework," Internet Draft (draft-ietf-nsis-fw-05.txt), Oct. 2003, pp. 1-45.

S. McCanne, et al.: "Receiver-driven Layered Multicast," ACM SIGCOMM, Aug. 1996, pp. 1-14.

W. Fenner; "Internet Group Management Protocol, Version 2," RFC 2236, Nov. 1997, pp. 1-24.

E. Amir, et al.; "An Application Level Video Gateway," Proceeding of ACM Multimedia, Nov. 1995, San Franscisco, CA, pp. 1-10.

B. Metzler, et al.; "Amnet: Heterogeneous Multicast Services based on Active Networking," Proceedings of the 2nd Workshop on Open Architectures and Network Programming (OPENARCH99), New York, USA, Mar. 1999, pp. 98-105.

3GPP TS 22.246 v6.1.0 (Mar. 2004); 3rd Generation Partnership Project; Technical Specification Group Services and System Aspects; Multimedia Broadcast/Multicast Service (MBMS) user Services; Stage 1, (Release 6), 1-16.

R. Braden, et al.; "Integrated Services in the Internet Architecture: an Overview," RFC 1633, Jun. 1994, pp. 1-33.

Yao-Chung, Lin, et al.; "Efficient FGS to Single Layer Transcoding," in Proc. IEEE int. conf. consumer electronics, Los Angeles, CA, Jun. 2002, pp. 134-135.

A. Vetro, et al. "Video Transcoding Architectures and Techniques: An Overview," IEEE Signal Proc. Magazine, Mar. 2003, pp. 18-29.

* cited by examiner

ADAPTIVE AND SCALABLE QOS ARCHITECTURE FOR MULTI-BEARER MULTICAST/BROADCAST SERVICES

FIELD OF THE INVENTION

The present invention relates to a method for filtering streams belonging to a single user service in a network entity of the core network or the radio access network of a mobile communication system. The packet streams, each being transported by a separate bearer service, provide a multicast or broadcast user service and are delivered from a service center via the network entity to a mobile terminal. Further, the network entity comprises a service manager providing a quality-of-service management function. The invention further relates to a network entity provided with filtering capabilities, as well as to a communication system comprising the network entity.

TECHNICAL BACKGROUND

Recent advances in coding techniques allow for transporting the data of a broadcast/multicast service onto multiple streams, e.g. alternative (simulcast) or optional (layered multicast). Such approaches have attracted attention of the Internet community for enabling coarse-grained quality adaptation in multicast communication and several works have built on these, as for example DiffServ (Differentiated Services—see Blake et al., "An Architecture for Differentiated Services", RFC 2475, 1998, all RFCs and Internet Drafts by the IETF are available at http://www.ieff.org), RSVP (see Braden et al., "Resource ReSerVation Protocol (RSVP)—Version 1 Message Processing Rules", RFC 2209, 1997), or NSIS (see Hancock, "Next Steps in Signaling: Framework", Internet Draft (draft-ietf-nsis-fw-05.txt), 2003). However, the architecture of 3 G communication networks, e.g. like that of 3GPP networks, differs from that of the Internet and thus demands different or additional solutions.

The increasing diffusion of bandwidth-intensive multimedia applications to heterogeneous groups of users led to intensive research in the area of multicast rate and congestion control in the Internet. Since the pioneer work of McCanne et al. (see McCanne et al., "Receiver-driven Layered Multicast", Proceedings of ACM SIGCOMM '96, p. 117 to 130, 1996), multi-rate multicast has been considered as a very promising approach for rate adaptation in streaming scenarios. Techniques have been proposed for transmitting the same content using multiple multicast groups mapping onto different quality levels, based on a cumulative layered data organization (hierarchically encoded) or on stream replication (independent and alternative streams). Moreover, a combination of both approaches is also possible. For example, a session of a single audio stream and several alternative video streams encoded with a standard coding scheme at different data rates or robust to different loss rates.

Generally, the Internet Multicast Model provides basic mechanisms for distributing data with different QoS parameters to subsets of the multicast distribution trees. The hosts, which communicate with the multicast routers using the Internet Group Management Protocol (IGMP—see Fenner, "Internet Group Management Protocol, Version 2", RFC 2236, available at http://www.ieff.org), can in principle actively adapt the QoS in a sub tree by joining/leaving multicast groups.

However, not all communication networks, e.g. mobile communications networks, follow Internet's end-to-end paradigm. In this regard, compliance to the end-to-end principle means that end hosts are responsible for adaptation to network conditions, relying exclusively on implicit network signaling, i.e., packet drops and delay variations.

Mobile communications networks, on the other hand, usually follow a network-centric approach for QoS provision, resulting in a different Broadcast/Multicast Service Model. Subscribed users are allowed to express their interest on a multicast session by IGMP or similar signaling to dedicated network nodes. The data distribution tree along which service data are provided, however, is build autonomously and modified by the network when necessary, e.g. in response to handover. This approach is advantageous in particular since the radio network controller has the knowledge of available resources (e.g. by providing resource control functionality), and it allows end users to be provided with a more or less seamless service.

Network-centric approaches for providing heterogeneous communication services in the Internet have also been developed. A well-known way to place enhanced functionality within the network is the establishment of transport-level or application-level gateways, or the introduction of active network nodes, as presented in Amir et al. "An application level video gateway", Proceeding of ACM Multimedia '95, San Francisco, Calif., USA, November 1995 or in Metzler et al., "AMnet: Heterogeneous Multicast Services based on Active Networking", Proceedings of the 2nd Workshop on Open Architectures and Network Programming (OPENARCH99), New York, N.Y., USA, March 1999, respectively.

While the former approach imposes significant overhead due to transcoding operations, the latter approach provides a framework that would have to be adapted in each case to provide network-specific functionalities and mechanisms.

The first concept for a heterogeneous QoS in the MBMS Architecture was proposed as Option G in the 3GPP TR 23.846: "Multimedia Broadcast/Multicast (MBMS); Architecture and functional description (Release 6)", V6.1.0, December 2002, available at http://www.3gpp.org. It defines a MBMS Bearer Service that may include multiple streams (optional or alternative), each mapping to a single RTP instance. Each stream is transported over a unique tunnel between GGSN (Gateway GPRS Support Node) and RNC (Radio Network Controller), which is maintained throughout the duration of a MBMS service.

Thereby, it is in principle possible for a RNC to choose a stream of a MBMS service at session start as well as changing/adding streams during the session. However, in order to allow for this functionality, appropriate mechanisms have to be implemented in the radio access network (RAN). A necessary prerequisite is the communication and management of stream states and relations, which allows a RAN node to choose the (set of) appropriate streams according to the current conditions of a cell or downstream nodes The 3GPP Multimedia Broadcast/Multicast Service (MBMS) Architecture currently only supports a very simple QoS model. It basically provides a non-scalable and non-adaptive service, where either all branches of a MBMS distribution tree are established with the same QoS or the whole service is cancelled. There is no negotiation of QoS values between network nodes, which implies that some of the branches may not be established if QoS requirements cannot be met by the according network nodes. This is relevant both at the beginning of a session or during a session, e.g. at each handover, when a new branch of the distribution tree has to be created/torn down.

On the other hand, mobile terminals are quite heterogeneous with respect to their provided capabilities, i.e., processing power, display size, etc. The current MBMS architecture cannot cope with this heterogeneity or it can by subjecting all terminals (those with better and worse capacity) to a worst case scenario, where all adapt to the lowest quality.

SUMMARY OF THE INVENTION

The object of the present invention is to provide an adaptive multimedia broadcast/multicast service QoS architecture that is scalable to a great number of users. A further object is to provide a broadcast/multicast service QoS architecture that is able to cope with heterogeneous terminals. Another object is to design an architecture allowing adapting to varying network conditions.

The object is solved by the subject matter of the independent claims. Advantageous embodiments of the present invention are subject matters to the dependent claims.

According to an embodiment of the invention a method for providing a multicast or broadcast service from a service center via at least one network entity to a mobile terminal is disclosed, wherein the multicast or broadcast service is provided in form of a plurality of packet streams each being transported via a single bearer service. The network entity may comprise a service manager providing a quality-of-service management function.

The network entity may receive information indicating the bearer services belonging to the multicast or broadcast service and the quality-of-service attributes required by the packet streams transported by the bearer services and/or required by packet stream combinations thereof, and may establish a service context comprising the received information.

Further the network entity may obtain from the quality-of-service management function quality-of-service constraints indicating a quality-of-service available for downstream data transmission for each downstream interface of the network entity. Based on the quality-of-service attributes stored in the service context, the network entity may select those bearer services from the bearer services belonging to the multicast or broadcast service, the streams of which are transmittable within the obtained quality-of-service constraints.

Further, the network entity may establish at least a part of the selected bearer services, wherein for each bearer service being established a link between the network entity and an upstream network entity is set up and may forward the packet stream of each established bearer service via the respective link to the mobile terminal.

In a further embodiment the establishment of at least a part of the selected bearer services may comprise transmitting a registration request to an uplink network entity or the service center for registering the selected bearer services, and receiving a registration response message from the network entity or the service center indicating those bearer services for which registration has been successful. Further, the establishment of at least a part of the selected bearer services may comprise establishing a link between the network entity and the upstream network entity for each successfully registered bearer service, and receiving via each established link the packet stream of the respective registered bearer service.

Thus, it is important to note that according to this embodiment of the invention the actual resource allocation, e.g. by means of establishing a link may only be performed in case the network resources allow the provision of a particular stream of the service. Hence, the context information of the bearer service via which the stream is provided may be present at the network entity but the resources for providing the actual data packets belonging to the stream/bearer service may only be reserved and allocated if the network conditions allow to. According to an embodiment of this invention a bearer service is considered "established" as long as the corresponding stream to that bearer service is sent by the service center. This may mean that such stream reaches all or a subset of the downstream nodes, i.e. those for which a link for the bearer service has been set up.

Another embodiment encompasses the storing the forwarding state of each of the bearer services belonging to the multicast or broadcast service for each downstream interface in the service context. This may for example allow the network entity keeping track of downstream network entities at each of its interfaces which receive the stream of the bearer service and which don't.

Another embodiment of the present invention relates to situations, in which the service level may be upgraded, i.e. the quality-of-service constraints relax. The network entity may receive from a downstream network entity a registration request for a bearer service. Based on the service context, the entity may determine if the packet stream of the requested bearer service is received by the network entity or not. If so, the network entity may transmit a registration response message to the requesting downstream network entity indicating a successful registration of the requested bearer service.

In a variation of this embodiment, the network entity may establish a link between the network entity and the requesting downstream network entity for forwarding the packet stream of the requested bearer service, if the registration response message indicates that registration has been successful.

If the network entity has determined that the packet stream of requested bearer service is not received by the network entity, same may transmit a registration request for the requested bearer service to an upstream network entity or the service center. In response thereto it may receive a registration response message from the upstream network entity or the service center indicating whether registration of the requested at least one bearer service has been successful.

In a further variation of the embodiment, if this registration response message indicates that registration has been successful, the network entity may establish a link between the network entity and the upstream network entity or the service center for forwarding the packet stream of the requested bearer service, and may transmit a registration response message to the requesting downstream network entity indicating a successful registration of the requested bearer service.

A further embodiment of the invention relates to the network entity detecting a change in the downstream quality-of-service constraints. The network may transmit a registration request for a bearer service to an upstream network entity or the service center and may receive a registration response message from the upstream network entity or the service center indicating whether registration of the requested bearer service has been successful.

In a variation of the embodiment, the network entity may establish a link between the network entity and the requesting upstream network entity or the service center for forwarding the packet stream of the requested bearer service, if the registration response message indicates that registration has been successful.

Another embodiment of the invention foresees to update the service context maintained at the network entity based on a received registration response message.

A further embodiment of the invention allows adaptation to changes in the quality-of-service constraints reported from the quality-of-service management function. According to this embodiment the network entity may receive from a downstream network entity a deregistration request for a bearer service. The network entity may release the link established for the bearer service between the requesting downstream network entity and the network entity, and may update the service context to indicate that the stream of the bearer service is no longer forwarded to the requesting downstream network entity.

In a variation of the embodiment, the network entity my further determine whether another downstream network entity other than the requesting downstream network entity maintains a link for the bearer service to the network entity, and if not, may transmit a deregistration request for the bearer service to an upstream network entity or the service center. Thereby, unnecessary resource reservation by unused links may be prevented.

In another embodiment, the network entity may transmit a deregistration request for a bearer service to an upstream network entity or the service center and may update the service context to indicate that the stream of the bearer service is no longer forwarded downstream to a downstream network entity or a mobile terminal. This may be for example applicable in situations, in which the network entity detects a change in the downlink quality-of-service constraints.

In another embodiment, the network entity may be an entity of the radio access network having quality-of-service management functionality or an entity of the core network having quality-of-service management functionality.

Moreover, a further embodiment of the invention foresees the network entity converting a stream of at least one selected bearer service to a stream transmittable within the quality-of-service constraints obtained from the quality-of-service management function. The conversion may e.g. comprise at least one of converting the bit rate of the stream, converting the codec type, the spatial or temporal resolution, and from multiple-layered to single-layered streams and from constant bitrate to variable bitrate streams or vice versa.

According to another embodiment of the invention, a network entity via which a multicast or broadcast service is provided from a service center to a mobile terminal is disclosed. The multicast or broadcast service may be provided in form of a plurality of packet streams each being transported via a single bearer service. The network entity may comprise a service manager providing a quality-of-service management function, and a receiver for receiving information indicating the bearer services belonging to the multicast or broadcast service and the quality-of-service attributes required by the packet streams transported by the bearer services and/or required by packet stream combinations thereof.

Further the network entity may comprise means for establishing a service context comprising the received information, means for obtaining from the quality-of-service management function quality-of-service constraints indicating a quality-of-service available for downstream data transmission for each downstream interface of the network entity, and means for selecting based on the quality-of-service attributes stored in the service context those bearer services from the bearer services belonging to the multicast or broadcast service, the streams of which are transmittable within the obtained quality-of-service constraints.

The network entity may further comprise means for establishing at least a part of the selected bearer services and transmission means for forwarding the packet stream of each established bearer service via the respective link to the mobile terminal. For each bearer service being established a link between the network entity and an upstream network entity may be set up.

In a variation of the embodiment, the network entity may further comprise means adapted to perform the steps of the method according to the various embodiments described above.

Another embodiment of the present invention relates to a mobile communication system. The communication system may comprise a service center, at least one mobile terminal receiving multicast or broadcast service and at least one network entity described above.

Further, an embodiment provides a computer readable medium for storing instructions that, when executed by a processor, cause to processor to provide a multicast or broadcast service from a service center via at least one network entity to a mobile terminal, wherein the multicast or broadcast service is provided in form of a plurality of packet streams each being transported via a single bearer service, the network entity comprising a service manager providing a quality-of-service management function, by receiving information indicating the bearer services belonging to the multicast or broadcast service and the quality-of-service attributes required by the packet streams transported by the bearer services and/or required by packet stream combinations thereof, and establishing a service context comprising the received information, obtaining from the quality-of-service management function quality-of-service constraints indicating a quality-of-service available for downstream data transmission for each downstream interface of the network entity, selecting based on the quality-of-service attributes stored in the service context those bearer services from the bearer services belonging to the multicast or broadcast service, the streams of which are transmittable within the obtained quality-of-service constraints, establishing at least a part of the selected bearer services, wherein for each bearer service being established a link between the network entity and an upstream network entity is set up, and forwarding the packet stream of each established bearer service via the respective link to the mobile terminal.

In a variation, the computer readable medium may further store instructions that, when executed by the processor, cause the processor to execute the steps of the method according to one the various embodiments above.

BRIEF DESCRIPTION OF THE FIGURES

In the following the present invention is described in more detail in reference to the attached figures and drawings. Similar or corresponding details in the figures are marked with the same reference numerals.

DETAILED DESCRIPTION OF THE INVENTION

Figure 1:
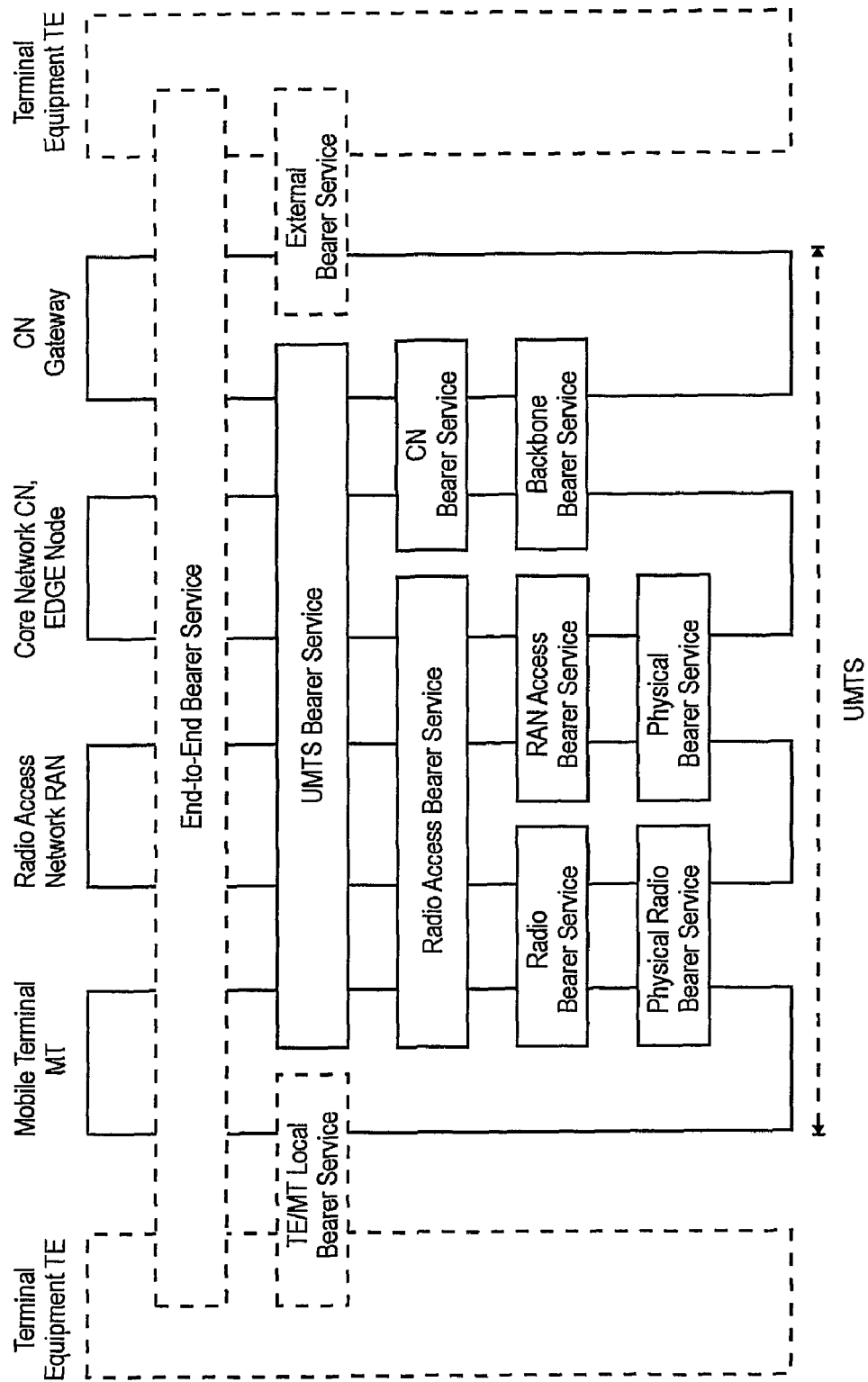
FIG. 1 shows an overview of the QoS architecture of UMTS.

The following paragraphs will describe various embodiments of the present invention. For exemplary purposes only, most of the embodiments are outlined in relation to a UMTS communication system and the terminology used in the subsequent sections mainly relates to the UMTS terminology. However, the used terminology and the description of the embodiments with respect to a UMTS architecture is not intended to limit the principles and ideas of the present inventions to such systems.

Also the detailed explanations given in the Technical Background section above are merely intended to better understand the mostly UMTS specific exemplary embodiments described in the following and should not be understood as limiting the present invention to the described specific implementations of processes and functions in the mobile communication network.

It is further noted that the present invention is mainly described with respect to bandwidth requirements and the respective to QoS adaptation. However, QoS differentiation and adaptation might also be applied to any other QoS parameter, e.g. the loss rate, or a combination of parameters.

Design Aspects for an Enhanced Multicast/Broadcast Service Architecture

The following aspects may be taken into account when designing a multicast/broadcast service architecture solving the above stated object of the present invention.

The MBMS architecture specified in 3GPP TS 22.246: "Multimedia Broadcast/Multicast (MBMS) user service; Stage 1 (Release 6)" (version 6.4.0, March 2004, available at http://www.3gpp.org) and 3GPP TS 23.246: "Multimedia Broadcast/Multicast (MBMS); Architecture and functional description (Release 6)" (version 6.1.0, December 2003, available at http://www.3gpp.org) is in an advanced stage. In order to be considered for fast and widespread deployment, an enhanced multicast/broadcast service architecture may follow the architectural specifications and only differ from these if reasonable. Thus, the negotiation of QoS between network nodes may be avoided and the resulting overhead regarding signaling and filtering may be kept as low as possible.

Further, another aspect when designing an enhanced multicast/broadcast service architecture is to cover a wide range of possibilities for content adaptation. For example available adaptive media codecs may be covered and a framework for future extensions may be provided.

One possible approach to overcome the limitations of the current MBMS architecture may be the use of adaptive media codecs. Examples of adaptive media codecs are layered codecs such as MPEG2 or MPEG4. These codecs typically encode media information in (at least) two or more layers, whereby the lowest layer is the most important layer. Following (higher) layers depend on previous (lower) ones.

Content may also be encoded in several independent representations, e.g. using an MPEG-1 encoder that allows providing alternative streams having differing bandwidth requirements or differing error resilience.

Another example of adaptive media codecs is the family of multiple description codecs (MDC). In this type of coding, the content is encoded in several complementary layers, i.e., the concepts of basic layer and dependency on previous layers disappears. In particular the higher the number of MDC-encoded packets received, the higher the quality obtained.

A further design consideration may be the availability of RAN (Radio Access Network) resources. As outlined previously, without loosing generality, the RAN may be typically considered being the critical system where the establishment of transport bearers may represent a bottleneck due to scarce radio resources. Thus, an enhanced multicast/broadcast service architecture may consider adaptation functionality in the radio network controllers.

Due to mobility of the end nodes, distribution trees might change during an ongoing session. Consequently, an enhanced multicast/broadcast service architecture may allow for both, adaptation at the session start and during a session, e.g. at handovers.

Another possible design aspect for an enhanced multicast/broadcast service architecture is to provide an adaptation for changing conditions in network and radio components. MBMS data may be distributed to multiple users through a MBMS distribution tree that can go through many RNCs and many SGSNs.

Figure 2:
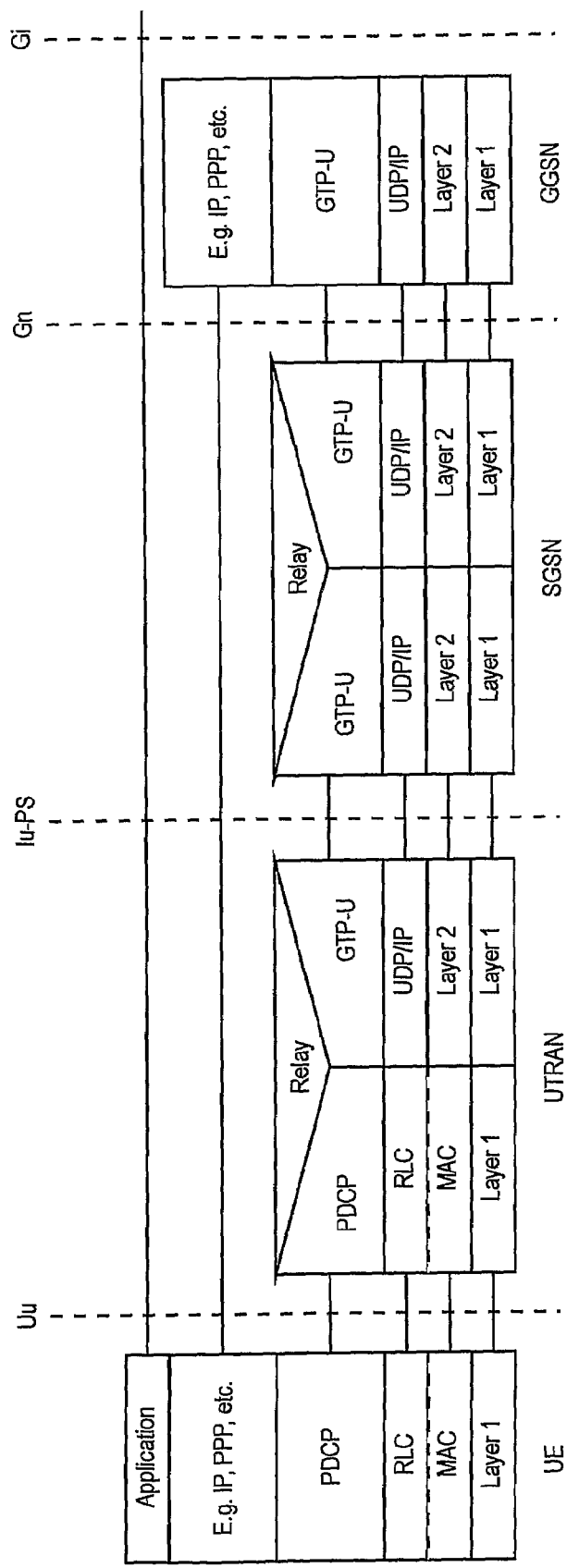
FIGS. 2 and 3 show the user plane protocol stack and the control plane protocol stack of the 3GPP MBMS architecture respectively.

Thereby, different media components comprising a single MBMS service from a user's point of view may be provided over separate GTP (GPRS Tunneling Protocol) tunnels (GGSN<->SGSN, SGSN<->RNC—see FIG. 2) and radio bearers (RNC<->UE) enabling QoS differentiation for each component. An enhanced multicast/broadcast service architecture may therefore tackle QoS issues at both the radio access and the core network.

In order to realize a certain network QoS a Bearer Service (e.g. UMTS/MBMS Bearer) with clearly defined characteristics and functionality may be set up from the source to the destination of a user service (e.g. multicast or broadcast service). A bearer service includes all aspects to enable the provision of a contracted QoS. These aspects are among others the control signaling, user plane transport and QoS management functionality. A UMTS bearer service layered QoS architecture is shown in FIG. 1. Each bearer service on a specific layer offers its individual services using services provided by the layers below.

The specific relations of the functions between the nodes (GGSN, SGSN, RNC, etc.) needed to specify, establish, modify and maintain a UMTS Bearer Service with a specific QoS may be implementation specific. This means that several technologies such as DiffServ, IntServ (see Braden et al., "Integrated Services in the Internet Architecture: an Overview", RFC1633, 1994), RSVP or MPLS may be used.

Considering the example of UMTS, the allocation of these functions to the UMTS entities means that these entities may enforce the QoS commitments negotiated for the UMTS bearer service. The specific realization of these functions may be implementation dependent and has only to maintain the specified QoS characteristics. The QoS management functions of all UMTS entities together may ensure the provision of the negotiated service between the access points of the UMTS bearer service.

Figure 9:
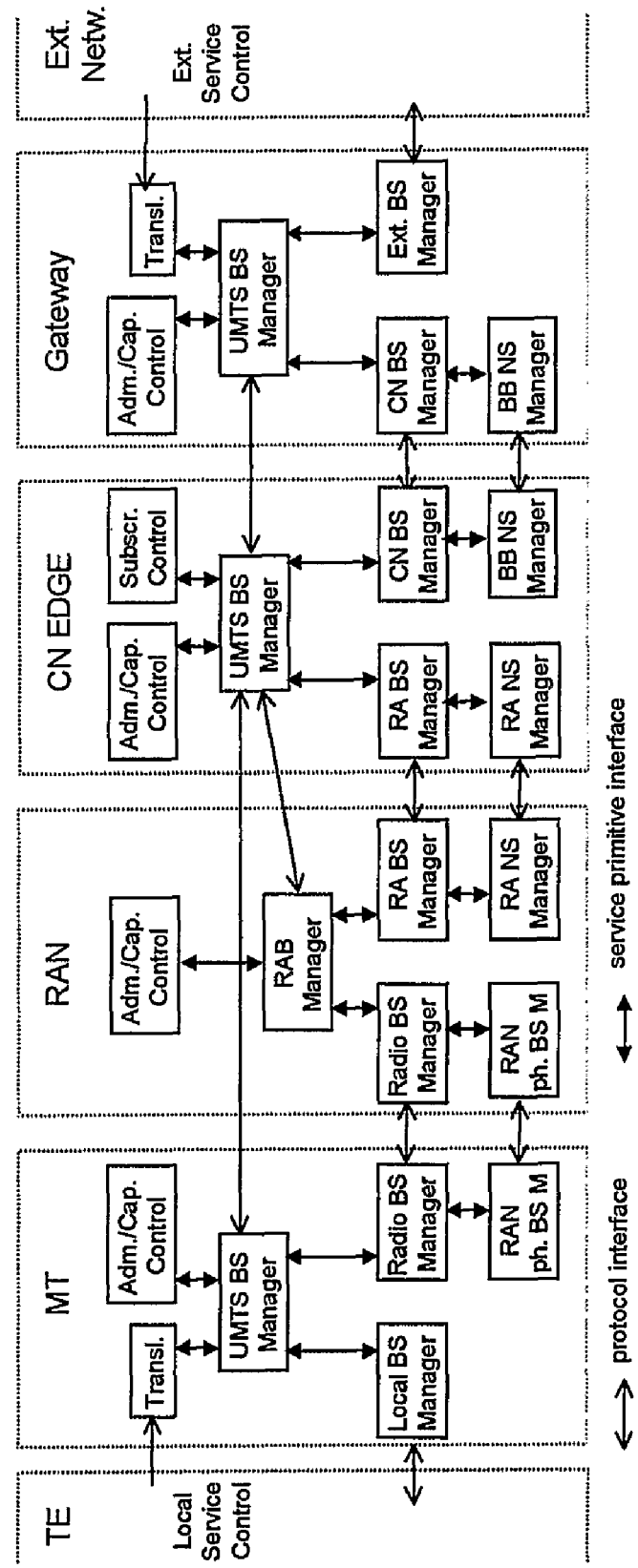
FIG. 9 shows QoS management functions for UMTS Bearer Service in the control plane.

For establishing a new enhanced multicast/broadcast service architecture, the functionality of the Service Manager as described in section 6.2.1.1 of 3GPP TS 23.107: "Technical Specification Group Services and System Aspects; Quality of Service (QoS) concept and architecture (Release 6)" (see version 6.1.0, March 2004) may be of particular interest. The service manager coordinates the functions of the control plane (e.g. MBMS Bearer Context) for establishing, modifying and maintaining the service it is responsible for (see FIG. 9). Further, it provides all user plane QoS management functions with the relevant attributes (e.g. guaranteed bitrate, maximum bitrate, maximum packet size, loss rate, etc.).

The service manager may further offer services to other instances (e.g. MBMS Bearer Context management functions), may signal with peer service managers and may use services provided by other instances. The service manager may further perform an attribute translation (e.g. application packet loss rate to RLC SDU loss rate, SDU Loss rate to Layer 1/Layer 2 block error rate) to request lower layer services. Furthermore, it may interrogate other control functions to receive permission for service provision.

Therefore, it may be assumed that such an underlying infrastructure is provided and that the interaction between the MBMS Bearer and the QoS management functions is given. This allows that both network (CN) and radio access network conditions, which are inherently bound to vary due to the uncertainty about how users will make use of the available resources and other unforeseeable events are made known to the context management functions for the MBMS Service.

E.g. an illustrative example of the latter is the typical flash-crowd phenomena, where a particular server and associated network segment is overloaded by users requests. Another example may be the failure of some node on the path or the uncertainty about how many users will join unicast services like 3GPP PSS.

Moreover, another aspect when designing an enhanced multicast/broadcast service architecture is to enable network-driven adaptation of the multicast/broadcast service. In the present MBMS architecture, the MBMS user will typically have little or no chance to negotiate the details of session delivery with the server (e.g. BM-SC). Here is where the network-driven adaptation becomes important.

Enhanced Multicast/Broadcast Service Architecture

According to one embodiment of the present invention the concepts of MBMS Transport Services and MBMS User Service are enhanced. An approach using multiple Bearer Services (for example MBMS Bearers) for providing a multicast or broadcast service (for example MBMS service) is considered. The QoS architecture is extended such that a differentiation of streams/bearers of a user service becomes possible at the network nodes (network entities). In this manner, network-driven adaptation to changing resources, heterogeneous terminals and different network components is possible using this information.

According to this approach, an additional state information in form of an MBMS User Service Context is introduced. The MBMS User Service Context stores references to the bearers comprising a service. Additionally, bearer relation information may be stored which defines the relation between the bearers, so that an adaptation node may perform activation/deactivation of bearers according to the downlink capabilities, e.g. the downstream QoS constraints.

The timeline of an MBMS Service considered in the following for exemplary purposes only would be as follows: in the data plane, optional/alternative/complementary streams for the requested multimedia broadcast or multicast service are forwarded downstream (each stream being transported via a single bearer service) as long as the QoS requirements (constraints) are met by any of the intermediate network entities. If an intermediate node may not forward all packet streams belonging to the user service, it filters out streams by selecting a subset of available bearer services in order to adapt the overall session stream to the available QoS. The relayed context information (e.g. within the MBMS Bearer Context and the MBMS User Service Context) enables network nodes to perform this filtering.

The context information may further allow the network to react to sudden capacity changes (up-/downgrades) because the nodes know the rest of options that would be available. The relayed context information describes the options for service configuration, i.e. the service semantics, and it may for example be stored in the MBMS User Service Context. E.g. the service semantics may for example comprise information on the bearers belonging to a user service and their inter-relation (layered, alternative, complementary), possible stream combinations—in case of alternative streams —, etc. A further design possibility may be forwarding information on the state of dropped and not dropped streams downstream. Details will be provided in the following paragraphs. Moreover, it should be further noted that in order to allow an adaption to sudden capacity changes, also the QoS profiles of the streams may be taken into account. This information may be readily available from the MBMS Bearer Context present in the adaption node, which comprises the QoS profile for each established bearer. Alternatively, it may also be considered to signal this information within the service semantics and to store them in the user service context.

Without loss of generality, the radio access network may be considered the bottleneck in the 3GPP architecture and the core network may be considered over-provisioned. It should be noted that the present invention is not to be limited to being applicable only under this assumption. Therefore filter entities (i.e. "adaptation nodes") may be exemplified in the RNCs, since the RNCs have knowledge about the available resources in the own radio domain. This makes them adequate for this functionality. In this manner, the RNC acts as "adaptation node".

In general, any network entity in the RAN or CN may act as a filter entity. However, it may be feasible to select those entities as filtering entities that are aware of the resources on the links downstream towards the mobile terminal receiving the requested service.

The initialization of a filter at the adapting network entity may be triggered using control messages. Therefore, the service semantics may be signaled downstream to the corresponding RNC using the MBMS Procedures as explained below. Service semantics may be understood as to refer to information on the streams conveying the user service, their inter-relation, and their QoS profiles.

According to one embodiment of the present information these pieces of information reflecting the service semantics is provided within optional fields of the specified MBMS signaling messages. Furthermore, intermediate nodes such as GGSNs and SGSNs may not need to parse and process the values of the message extensions if they do not understand them. They may only forward them downstream.

According to another embodiment of the present invention the adaptive QoS concept outlined above further aims to allow services to support different paradigms for encoding a given content, e.g. layered, alternative or complementary. This is a novel approach for providing MBMS Services and, as such, it has not yet been reflected in the current architecture. Presently, only the placeholder for the signaling and management of the necessary MBMS Context information is defined but not how the different possibilities are implemented. The use of an MBMS User Service Context for storing the service semantics (e.g. information on bearers belonging to a service, their inter-relation, their QoS profiles, etc.) is thus compatible with the current MBMS architecture.

MBMS User Service Context

In the following a novel MBMS User Service Context according to an embodiment of the present invention maintained in the adaption nodes is described. It reflects the session semantics, i.e., it provides information about the bearer relations and describes additional bearer properties needed for making forwarding decisions at the adaptation node. The MBMS Bearer Context may remain unchanged and may conform to the current 3GPP specification.

TABLE 1

| MBMS User service Context according to an embodiment of the present invention. | |
|---|---|
| Parameter | Description/Value |
| MBMS User Service ID | Identifier of the MBMS User Service. The MBMS User Service ID identifies for example the different IP multicast addresses of streams belonging to the service. |
| Bearers IE | Information Element on each MBMS Bearer (see below) composing the MBMS User Service. This field contains at least a description for one bearer. |

Each bearers information element may comprise different fields dependent on the streams' interrelation. For each exemplified type (layered, alternative and, complementary) the information element will be described below.

TABLE 2.1

| Stream IE for Layered Bearers | |
|---|---|
| Type of Bearers | Type of relation between the bearers (e.g. layered, alternative, complementary, or void) to the other bearers in the MBMS service. If "void" the service consists of just one bearer. |
| Bearer List | This is a list containing Bearer List Elements (LEs) describing each a bearer of the type specified in the above field. |

TABLE 2.2

| Bearer List Element for Layered Bearers | |
|---|---|
| MBMS Bearer ID | Identifier of the MBMS Bearer, for example the IP Multicast Address for identifying the MBMS Bearer context. Identifiers other than an IP Multicast Address may be used. |
| Forwarding State | List containing the Forwarding State of the stream in this MBMS Bearer (e.g. "forward" or "drop") for each downstream node. A network node may have several downstream nodes (e.g. several RNCs attached to an SGSN) to which the stream may or may not be forwarded. For each of the downstream node interfaces, the forwarding state of this stream/bearer is specified in this list. |
| Priority | The priority of the MBMS Bearer. |

TABLE 3.1

| Stream IEs for Alternative Bearers: | |
|---|---|
| Type of Bearers | Type of relation between the bearers (e.g. layered, alternative, complementary, or void) to the other bearers in the MBMS service. If "void" the service consists of just one bearer. |
| Bearer List | This is an array containing Bearer List Elements (LEs) each describing a bearer of the type specified in the above field. |
| Default Bearer Combination | This field identifies the default bearer or combination of bearers for the MBMS User Service. |

TABLE 3.1-continued

| Stream IEs for Alternative Bearers: | |
|---|---|
| Alternative Bearer Combinations | This field identifies which combinations (using the bearer identifiers) of bearers are reasonable alternatives to the default option above. The alternative bearer combinations may define, e.g. lower bandwidth bearer combinations. Other combinations may, e.g. define combinations of the bearer in a language different from that of the default option. Further, region-based combinations may be expressed to fit the bearer combination to the region where the MBMS service is offered in, e.g. location based services. |

TABLE 3.2

| Bearer List Element for alternative Bearers | |
|---|---|
| MBMS Bearer ID | Identifier of the MBMS Bearer, for example the IP Multicast Address for identifying the MBMS Bearer context. Other identifiers are possible. |
| Forwarding State | List containing the Forwarding State of the stream in this MBMS Bearer (e.g. "forward" or "drop") for each downstream node. A network node may have several downstream nodes (e.g. several RNCs attached to an SGSN) to which the stream may or may not be forwarded. For each of the downstream node interfaces, the forwarding state of this stream is specified in this list. |

TABLE 4.1

| Stream IE for Complementary Bearers | |
|---|---|
| Type of Bearers | Whether bearers are layered, alternative, complementary or other. Type of relation between the bearers (e.g. layered, alternative, complementary, or void) to the other bearers in the MBMS service. If void the service consists of just one bearer. |
| Bearer List | This is an array containing Bearer List Elements (LEs) describing each a bearer of the type specified in the above field. |

TABLE 4.2

| Bearer List Element for Complementary Bearers | |
|---|---|
| MBMS Bearer ID | Identifier of the MBMS Bearer, for example the IP Multicast Address for identifying the MBMS Bearer context. Other identifiers are possible. |
| Forwarding State | List containing the Forwarding State of the stream in this MBMS Bearer (e.g. "forward" or "drop") for each downstream node. A network node may have several downstream nodes (e.g. several RNCs attached to an SGSN) to which the stream may or may not be forwarded. For each of the downstream node interfaces, the forwarding state of this stream is specified in this list. |

Multiple-Bearer Approach

The multiple-bearer approach according to an embodiment of the invention exploits the potentials of architectures where user services may utilize multiple transport channels (i.e. MBMS Bearers). The functional elements of this approach are a new definition of an MBMS User Service Context as described above with reference to tables and the introduction of so-called "adaptation nodes", which activate and deactivate the appropriate bearers(s) of a service in order to adapt same to the network conditions and user preferences. The additional information required for the operation of the adaption nodes may be stored in the above mentioned service context. Further it should be noted that there may be more than one adaptation node within the distribution tree of the service.

Figure 8:
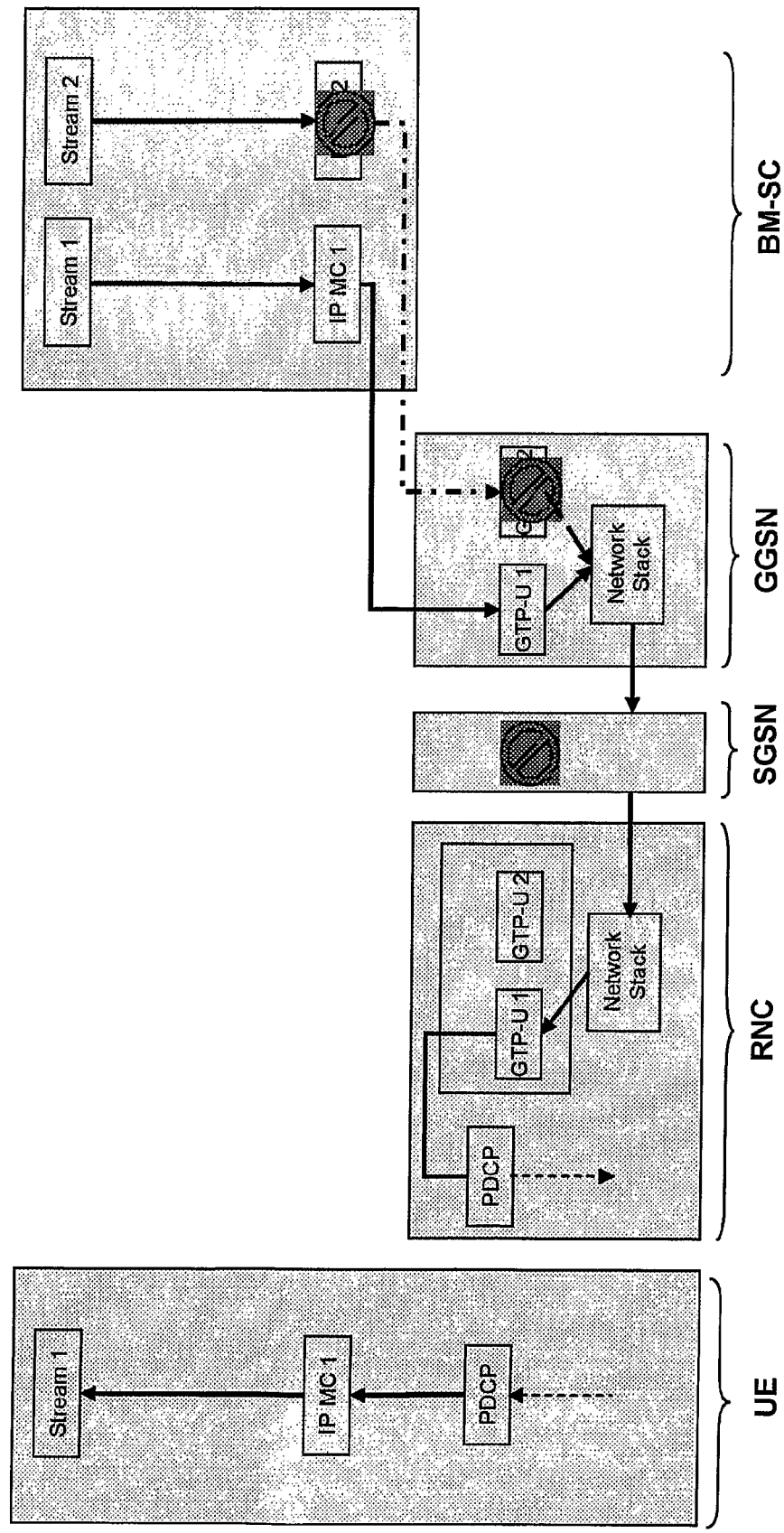
FIG. 8 shows a multiple bearer QoS architecture according to an embodiment of the invention.

According to this embodiment, the multicast or broadcast service comprises a plurality of alternative, layered or optional streams. For each stream forwarded by an adaptation node a separate bearer service is established. For this purpose, a unique service IP address may be allocated per stream, as depicted in FIG. 8.

According to one embodiment of the invention, the adaptation node is provided with information about the bearers comprising an MBMS User Service. For the storage of that information, a MBMS User Service Context (see tables 1, 2.1, 2.2, 3.1, 3.2, 4.1 and 4.2 above) may be used. This context includes the MBMS User Service identifier and the Bearers IE, which specifies the relation of the bearers. Additional Bearer IEs can be defined to specify other bearer dependencies. The Bearers IE contains a list of identifiers of related MBMS Bearers and information on these: e.g. MBMS Bearer ID, Priority and Forwarding State. Since each bearer may be allocated a unique IP Multicast address, which is also stored in the corresponding MBMS Bearer Context, preferably this IP address serves as an appropriate MBMS Bearer ID. For alternative bearer types, the default option and an explicit list of meaningful bearer combinations must be included.

In order to establish the MBMS User Service Context at the adaptation node(s), the messages already defined in the MBMS Procedures, e.g. the MBMS Registration Procedure, may be reused in extended form to convey the necessary information to establish the MBMS User Service Context. (One of) These procedures may trigger the registration of the network nodes involved in the MBMS Service, i.e. instantiating the MBMS Bearer Context and the MBMS User Service Context.

Figure 10:
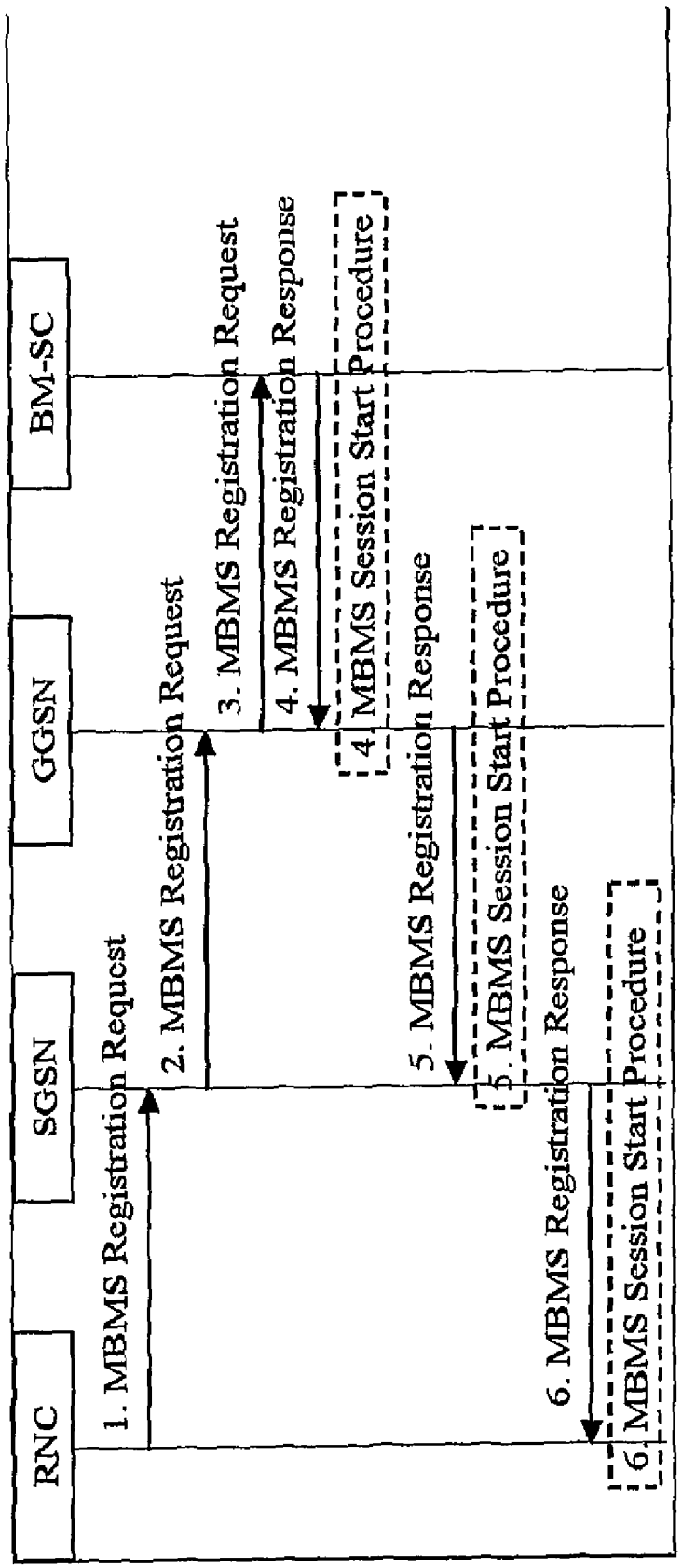
FIG. 10 shows an MBMS Registration procedure according to the MBMS standard.

The MBMS Registration procedures (see FIG. 10) may be sufficient to establish the MBMS User Service Context described above, since no QoS attributes may be defined in the MBMS User Service Context. The QoS attributes of the individual bearer services belonging to the service may already be present as part of the corresponding MBMS Bearer Contexts.

For this purpose, the adaptation node must express its interest in having the MBMS User Service Context information. An alternative may be that the service center will include the relevant information in the messages exchanged in the Registration Procedures by default.

Figure 5:
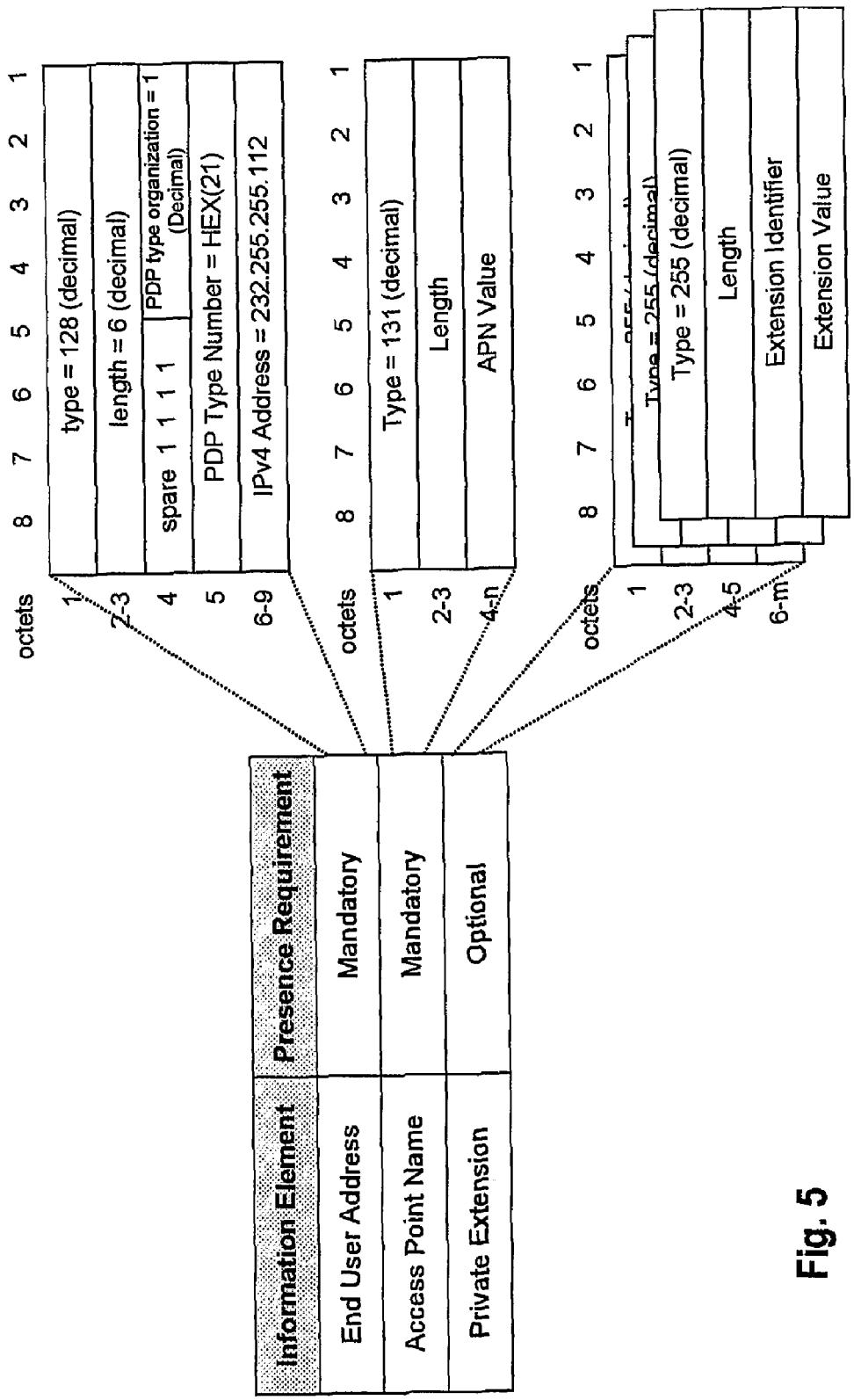
FIG. 5 shows a GTP-C MBMS Registration Request message.

For this purpose, the Private Extension IE of the MBMS Registration Request as shown in FIG. 5 may be used. Alternatively, a mandatory field in this message can be defined. A further alternative may be the definition of new MBMS procedures and messages for the purpose of establishing the MBMS User Service Context.

Following the establishment of the MBMS User Service Context by means of the Registration Procedure, the MBMS Session Start procedure may be used to communicate and reserve the actual bearer plane QoS attributes as specified in the QoS profile in the MBMS Bearer Contexts (for more details see MBMS Session Start procedure in section 8.3 of 3GPP TS 23.246).

In this manner, only those nodes that perform adaptation would be able to use the information conveyed in these MBMS messages. Other non-compatible nodes may ignore them and may forward them to the next downstream nodes.

Figure 3:
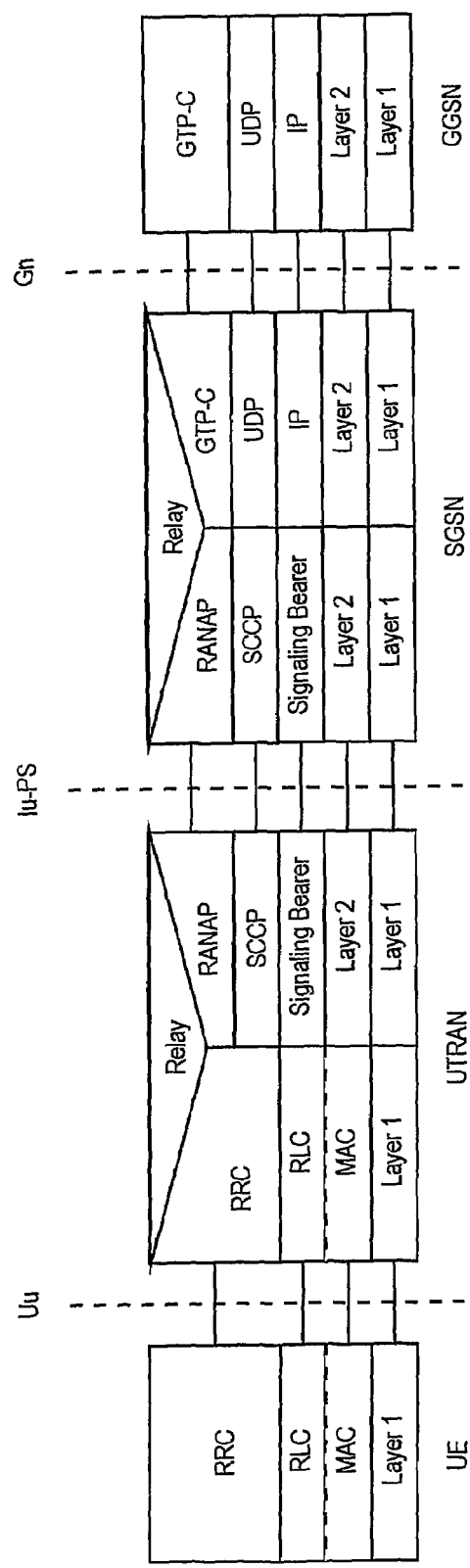
Figure 4:
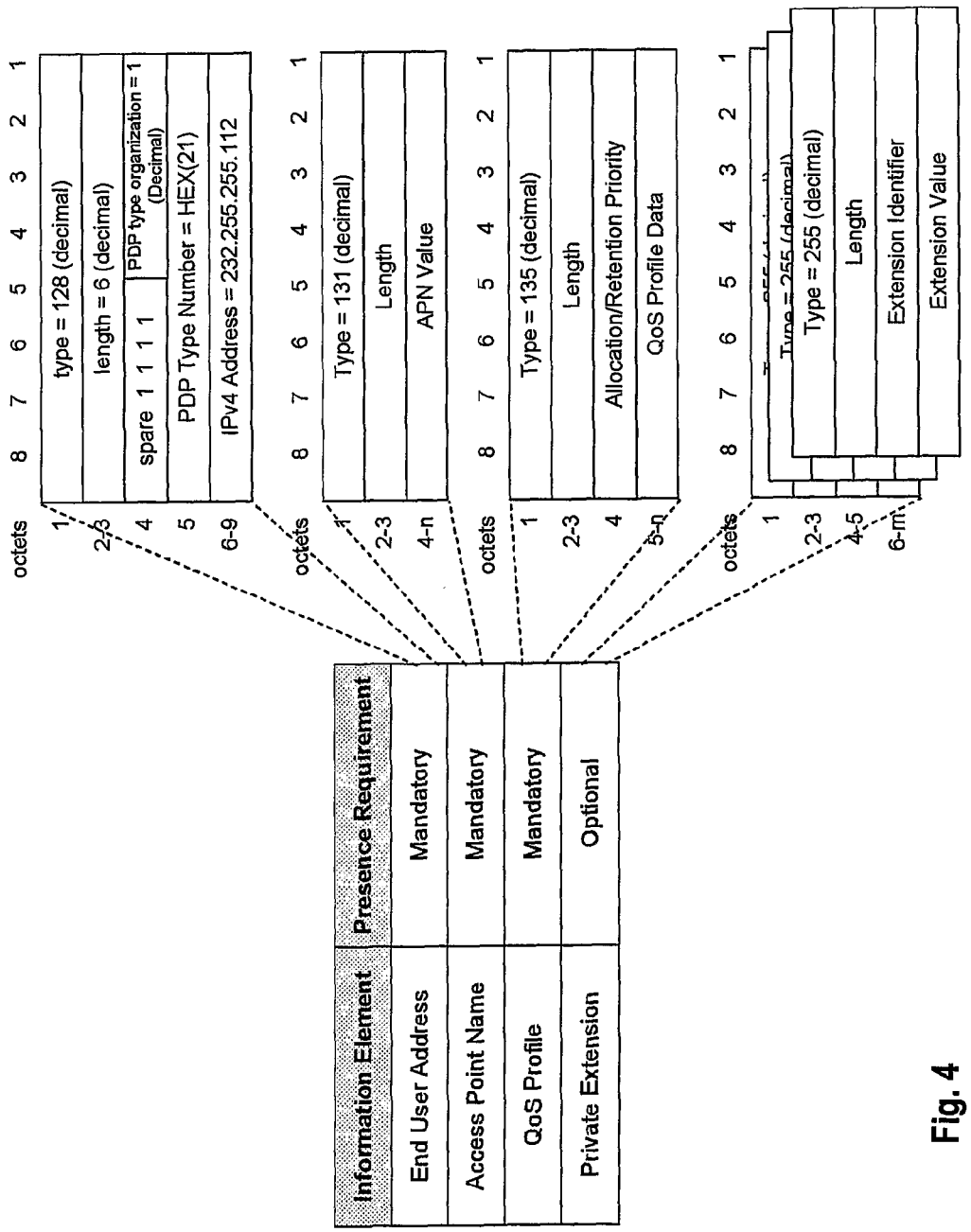
FIG. 4 shows a GTP-C MBMS Session Start Request message.

The examples given above have been restricted to core network (CN) messages (GGSN<->SGSN). In the CN, the MBMS Registration Request message as shown in FIG. 5 is part of the GTP-C protocol (see also control plane protocol stack in FIG. 3), which may be generally the case for all MBMS control messages. However, between the CN and the RAN signaling may be accomplished using the RANAP (Radio Access Network Application Part) protocol.

Since the RANAP protocol currently does not explicitly define MBMS-specific message formats, it is suggested that the attributes defined for the CN messages find equivalent mapping within optional or newly defined mandatory IEs in messages exchanged in the UTRAN by means of the RANAP protocol. Those skilled in the art will appreciate that, generally, either extensions, modifications or replacements to the functionalities and contents of the messages and procedures may be likewise accomplishing the functionalities described above.

Once an adaptation node has built the MBMS User Service Context, it is ready to receive the MBMS Session Start Requests for each registered bearer for which an MBMS Bearer Context is present.

In contrast to the standard mechanisms, where each MBMS Session Start request is treated independently, the adaptation node may consider all the MBMS Session Start Request messages together, since these bearers may be inter-related. As explained above, the bearers' inter-relation is part of the information maintained in the MBMS User Service Context.

According to one embodiment of the invention, when receiving a MBMS Session Start message of any of the registered bearers, the adaptation node may update the MBMS Bearer Context and may wait for the session start request messages of all other related bearers. The adaptation node may resolve the bearer relation and bearer priority (or meaningful bearer alternatives) from the MBMS User Service Context, and the QoS requirements of each bearer by its MBMS Bearer Context and may thereby determine the set of bearers better matching the resources reserved for that MBMS Service. As explained above, the available resource available on the respective downstream interfaces of the adaptation node may be obtained for example from the service manager, i.e. its QoS management function.

Alternatively, the adaptation node may already start providing the service when receiving MBMS Session Start message of any or some of the registered bearers, if those already allow doing so. In this case, the respective MBMS Bearer Context may indicate for each of the registered bearers whether a Session Start message has been received or not, i.e. the bearer state is either "active" or "standby".

Thus, the bearers best matching the downstream QoS constraints on each downstream interface of the adaptation node may be selected based on the bearer relation and bearer priority (or meaningful bearer alternatives) from the MBMS User Service Context and the QoS requirements and status information of each bearer by its MBMS Bearer Context.

Returning to the exemplary embodiment in which the adaptation node waits for the MBMS Session Start messages for all registered bearers, once all session start requests have been received—or a timer has expires—the adaptation node may test for the QoS requirements of each provided QoS level of a bearer or combination of bearers. For the best QoS level that can be supported under the current network conditions, a positive MBMS Session Start Response may be sent for the corresponding bearer or bearers, while for all others a negative reply is sent. For example, the those bearers belonging to combinations of bearers that fit the available bitrate on the downstream interfaces may be positively acknowledged in the response message.

Note that streams that are not supported by the downstream nodes do not reach the adaptation node, since their bearers are rejected with MBMS Session Start response e.g. by indicating "No Resources Available" by the adaptation node, either during the MBMS Session Start Procedure or during a service. This may contribute to efficient utilization of resources.

Dynamic Adaptation of the MBMS User Services

As becomes apparent from the embodiments above, by establishing a MBMS User Service Context in the adaptation nodes the basics for dynamic adaptation of the multicast or broadcast service are set, i.e. in the case of an upgrade or downgrade (in terms of QoS) of any one of the downstream nodes, this could be managed by the adaptation node.

Making use of the MBMS User Service Context, the adaptation node may decide which bearer is activated/deactivated for that particular node and may initiate the corresponding procedures. In this context it should be noted that a bearer service remains established as long as its stream is provided by the service center. According to an embodiment of the present invention, the distribution tree for each bearer service of the multicast or broadcast service is dynamically adapted to the network conditions by adding/releasing links between network nodes dependent on the network conditions. For example, if an adaptation node requests an upgrade of the service at an upstream adaptation node, e.g. an additional bearer of the service, a new branch in the distribution tree of the requested bearer is established, if the network resources on the upstream interfaces within the distribution tree relative to the requesting adaptation node allow doing so. This process will be explained in more detail with reference to FIGS. 6 and 7 below.

The adaptation of the MBMS User Service may be defined as the process of upgrading, downgrading or in any way modifying the parameters of the MBMS User Service Context. Adaptation may be feasible in several cases, for example when an UE moves from one cell hosted by one RNC to another hosted by a different RNC, when an UE requests to receive the service in the middle of an ongoing MBMS Service or when the adaptation nodes realize that available resources have changed, for better or worse.

Two types of adaptation may be defined. Static adaptation may be performed at the beginning of the Service, while dynamic adaptation may be performed during the service, as mentioned above.

Furthermore, generally adaptation may be performed when there are one or several adaptation nodes in the network. According to an exemplary embodiment of the invention dynamic adaptation is performed in a system where there is more than one adaptation node, e.g. RNC and SGSN, available.

In order to perform an adaptation of e.g. MBMS user services, the adaptation nodes may interface with a QoS management function provided in each adaptation node, i.e. the service manager as described above. A QoS management function is in charge of controlling, assigning and monitoring the resources available in a network being part of the radio access network or core network. Section 6.2 of 3GPP TS 23.107 gives details on the operation of such a framework.

Assuming that each adaptation node has access to QoS management functions each adaptation node can notice the change in capacity or availability of its network interfaces. Examples of these changes may be an increase or decrease of the number or capacity of the tunnels to be established to downstream or upstream nodes for providing MBMS services.

Note that adaptation during the MBMS Session Start procedure has been addressed above. In the following an exemplary embodiment of the invention described the case where an additional bearer is requested with reference to FIGS. 6 and 7. Please note that the operation for dropping a bearer service is analogous.

Figure 6:
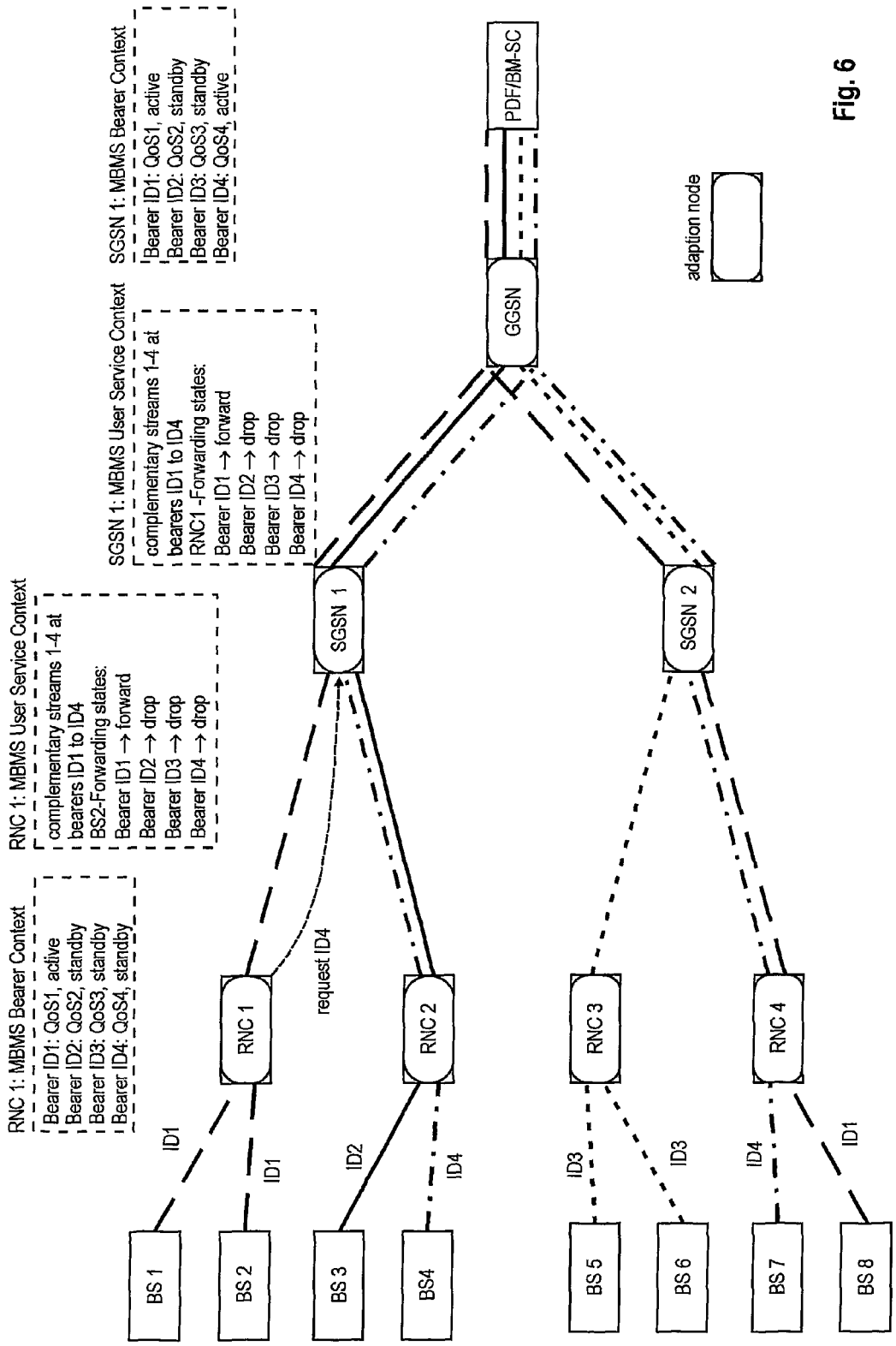
FIGS. 6 and 7 show a distribution tree of a multiple bearer QoS architecture according to an embodiment of the invention before and after performing an adaption to changing network resources.
Figure 7:
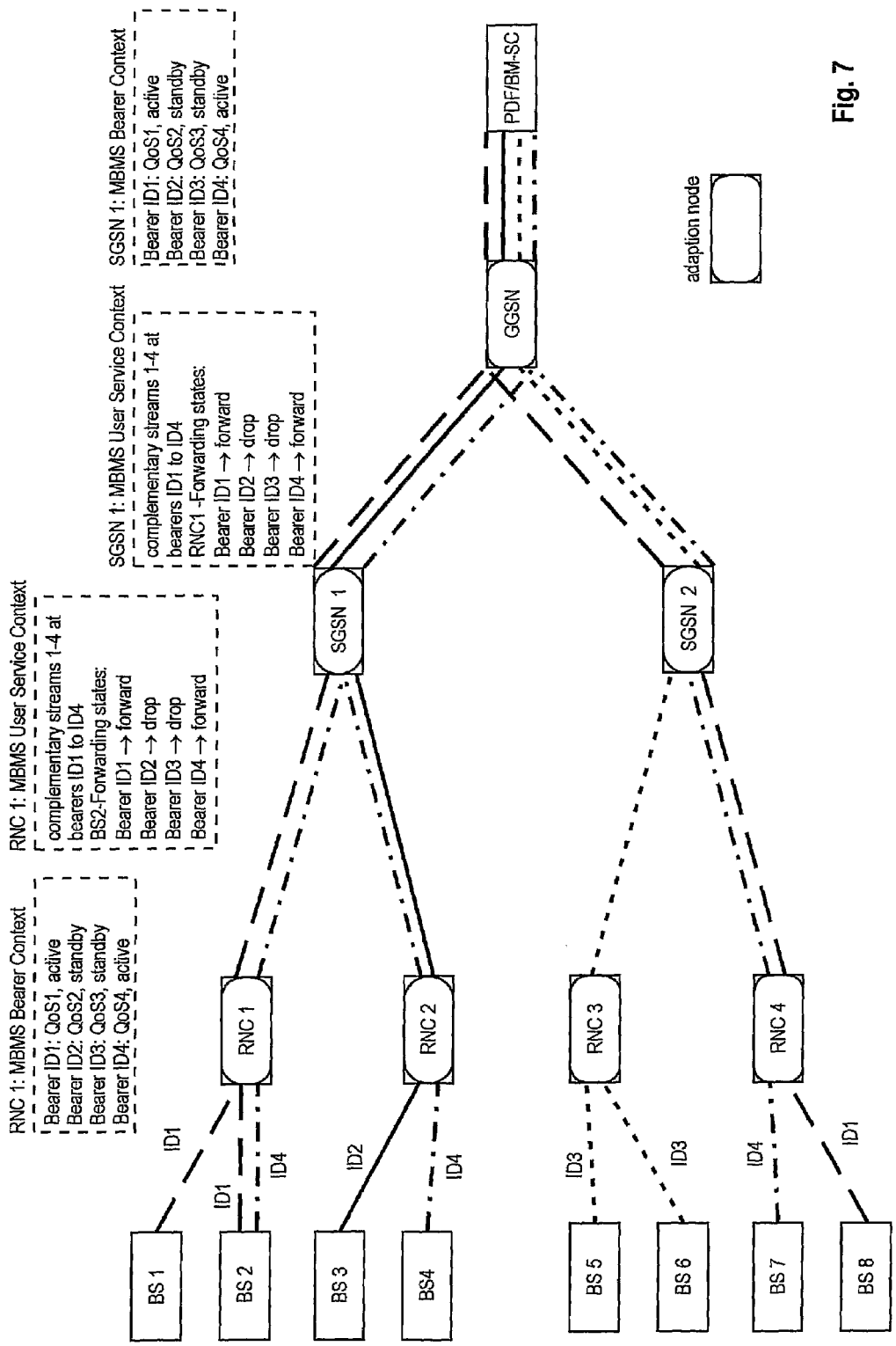

When the adaptation node has figured out that an additional bearer is needed by a downstream node and it has sufficient capacity on the interface to the downstream node, it may issue a MBMS Registration Request (see FIG. 6: "request ID4") for an additional bearer to the next upstream adaptation node. Due to having the MBMS User Service Context available at the adaptation nodes, same may identify bearers belonging to a user service. As can be recognized from RNC1's MBMS User Service Context, the forwarding state of bearer ID1 is set to "forward" only, since only the stream of bearer ID1 is provided to BS2. The QoS profile of each of these bearer services may be readily present within the MBMS Bearer Context. Please further note that the requested bearer with ID4 is in "standby" mode since no data of the bearer are presently received RNC1. Hence, by using the information in the context information available at each adaptation node, an adaptation node may select the appropriate bearer (combination) for providing a service base on the present network resources.

The functionality of this new MBMS Registration Request when requesting an additional bearer service may be limited to poll the upstream adaptation nodes for available resources. In case the polled nodes have sufficient resources available either:

1. they also have the requested bearer available. In FIG. 6, SGSN 1 has the bearer ID4 available (see "Bearer ID4: QoS4, active" in Bearer Context) since same is forwarded to RNC2. In this case they may forward the requested bearer, by setting their Forwarding State of this bearer for the respective interface from 'Drop' to 'Forward' within the service context for the respective interface to RNC1 and may additionally propagate a positive MBMS Registration Response downstream.

The adaptation node may issue a new MBMS Session Start Request downstream in addition to the forwarded bearer and the MBMS Registration Response. However it is not strictly necessary since the QoS profiles may already have been established in the downstream nodes. Moreover, the requesting downstream node may update its contexts accordingly (see FIG. 7): in the Bearer Context of RNC1, the bearer ID4's state is set to "active" since RNC1 now receives data via this bearer service. Further, in the User Service Context, RNC1 sets the forwarding state to "forward" for the interface to BS2 since it propagates the data of the requested bearer to same.

2. they do not have the bearer but have the capability to provide it downstream. This would be reflected in the respective contexts as follows (see FIGS. 6 and 7): The User Service Context for RNC1 would have an entry "Bearer ID4→drop" for all interfaces and an entry "Bearer ID4: QoS4, standby" in the Bearer Context. In this case the adaptation node may propagate the MBMS Registration Request upstream until an adaptation node that successfully registered the requested bearer or the BM-SC is reached. In both cases the procedure as described in item 1 above may be performed.

3. The third possibility is that no adaptation node has successfully registered the bearer or the capability to provide the bearer downstream available. In this case the adaptation node may send a negative MBMS Registration Request Response.

Once a positive MBMS Registration Request has arrived at an adaptation node in the downstream path to the originator of the request, the corresponding MBMS Bearer Context may be set to "active" and the data may be forwarded to the downstream nodes. This process may repeat recursively until all MBMS Bearer Contexts and MBMS User Service Context correspondingly update the Forwarding State fields to 'Forward', for the affected interfaces respectively.

In case no adaptation node has successfully registered the bearer or the capability to provide the bearer downstream is available, a continuous polling of the upstream nodes may be possible which may result in faulty network behavior. In order to avoid this, another embodiment of the present invention suggests prohibiting later polling until the upstream node responds positively to the initial MBMS Registration Request. This also means that upstream nodes that denied such upgrades shall also monitor whether the upgrade is possible at a later time. Thereby, it is understood that the upstream node would like to serve such request now.

In the case of bearer dropping (downgrade) the links established between network nodes in a branch of the distribution tree for the respective bearer may released as far upstream as possible. According to an embodiment of the present invention after the adaptation node drops the chosen bearer, i.e. releases the established link to propagate the stream of the bearer downstream, the adaptation node may send an MBMS Registration Request upstream.

A positive MBMS Registration Response may be received in response, meaning that also all other adaptation nodes upstream have chosen to drop the bearer. Thereby, bandwidth may be saved due to no other adaptation node except, the originator actually needs the stream associated to the bearer. A negative response may indicate that another node actually needs the locally dropped bearer.

The multiple bearer approach outlined in the different embodiments of the description above may be implemented using simple decision logic since the adaptation node filters streams by activating/deactivation transport bearers. Thus, the implementation in RAN and CN nodes may be easily accomplished due to the simple decision logic.

Further, the adaptation to user preferences and capabilities is possible by the users (or within network) by choosing the appropriate set of bearers. Also this approach is resource efficient, since only resources for the utilized bearers are reserved, i.e. the necessary link between network nodes are only established if necessary.

Scalable and Adaptive QoS Architecture in Evolved UTRAN

Future UTRAN architectures envision the provision of more intelligence (enhanced control & management functions) to be pushed further to the edges of the network, for example to the Node Bs (base stations). One reason to do this may be to eliminate the single point of failure that the RNC constitutes currently. It is to be noted that this future UTRAN architecture might perfectly accommodate the adaptive QoS architecture according to the different embodiments described above.

For using the principles outlined above, the MBMS Bearer Context may be correspondingly replicated in the new nodes and the MBMS User Service Context in those nodes that act as adaptation nodes, e.g. the Node B+s of the new UTRAN architecture. The proposed MBMS procedures may be extended accordingly. Other functionalities and requirements are similar to those outlined in sections above.

Stream Conversions

In another embodiment of the invention it is suggested that the adaption node may be further equipped with means allowing a conversion of packet streams, for example to match one or more streams of the service to the downstream QoS constraints. This may be for example applicable in situations where the QoS check for each downstream interface of the node fails for each of the streams offered by the service via its associated bearers.

An overview of possible stream (or combination of streams) conversions is presented in "Video Transcoding Architectures and Techniques: An Overview" by A. Vetro et al., (IEEE Signal Processing Magazine, March 2003). Transcoding techniques may respond to different needs, e.g.:
  codec conversion to switch between different codecs
  temporal resolution or frame rate reduction,
  reduction of the spatial resolution,
  Constant Bit Rate to Variable Bit Rate conversion and
  conversion of multiple layer streams to a single layer stream.

Applying a codec conversion may be appropriate when different architectures or proprietary networks interface, e.g. conversion of MPEG files to Windows proprietary WMA codec. Frame rate reduction may be useful for reducing the bitrate, while maintaining the quality of the encoded pictures and reducing the processing needs. A typical use case for frame rate reduction is a surveillance application, where a reduced rate keeping the picture resolution is an acceptable compromise in terms of storage capabilities.

The reduction of the spatial resolution may be useful when adapting the media to smaller devices, such as mobile terminals. A typical conversion is from MPEG-2 video (5,3 Mbps, 30 fps, 720×480) to MPEG-4 Simple Profile Level 2 (128 Kbps, 10 fps, 352×240).

The conversion of constant bitrate streams to variable bitrate streams is exemplified in Yong et al., "VBR transport of CBR-encoded video over ATM networks," in Proc. 6th Int. Workshop Packet Video, Portland, Oreg., September 1994. The objective is to cope with constant bit rate streams in variable bit rate networks.

Furthermore, the conversion of multiple-layered streams, e.g. MPEG-4 FGS, to single-layer streams is another example of conversion that an adaptation node may carry out. This is exemplified in Lin et al., "Efficient FGS-to-single layer transcoding," in Proc. IEEE Int. Conf. Consumer Electronics, Los Angeles, Calif., June 2002, pp. 134-135.

Hardware and Software Implementation

Another embodiment of the present invention relates to the implementation of the above described various embodiments using hardware and software. It is recognized that the various above mentioned methods as well as the various logical blocks, modules, circuits described above may be implemented or performed using computing devices, as for example general purpose processors, digital signal processors (DSP), application specific integrated circuits (ASIC), field programmable gate arrays (FPGA) or other programmable logic devices, etc. The various embodiments of the present invention may also be performed or embodied by a combination of these devices.

Further, the various embodiments of the present invention may also be implemented by means of software modules which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

The invention claimed is:

1. A method for providing a multicast or broadcast service from a service center via at least one network entity to a mobile terminal, wherein said multicast or broadcast service is provided in the form of a plurality of packet streams each being transported via a single bearer service, said network entity comprising a service manager providing a quality-of-service management function and the method comprising:

receiving by said network entity information indicating the bearer services belonging to the multicast or broadcast service and the quality-of-service attributes required by the packet streams transported by the bearer services or required by packet stream combinations thereof, and establishing a service context comprising the received information, obtaining by said network entity from the quality-of-service management function quality-of-service constraints indicating a quality-of-service available for downstream data transmission for each downstream interface of the network entity, selecting by said network entity based on the quality-of-service attributes stored in the service context those bearer services from said bearer services belonging to the multicast or broadcast service, the streams of which are transmittable within the obtained quality-of-service constraints, establishing at least a part of the selected bearer services, wherein for each bearer service being established a link between the network entity and an upstream network entity is set up, and forwarding the packet stream of each established bearer service via the respective link to the mobile terminal.

2. The method according to claim 1, wherein the establishment of at least a part of the selected bearer services comprises:

transmitting a registration request from said network entity to an uplink network entity or the service center for registering the selected bearer services, receiving by said network entity a registration response message from the network entity or the service center indicating those bearer services for which registration has been successful, establishing a link between the network entity and the upstream network entity for each successfully registered bearer service, and receiving by said network entity the packet stream of the respective registered bearer service via each established link.

3. The method according to claim 1, further comprising storing by said network entity and in said service context the forwarding state of each of said bearer services belonging to the multicast or broadcast service for each downstream interface.

4. The method according to claim 1, further comprising:
receiving by said network entity a registration request for a bearer service from a downstream network entity, determining by said network entity based on the service context, if the packet stream of the requested bearer service is received by the network entity, and if so, transmitting by said network entity a registration response message to the requesting downstream network entity indicating a successful registration of the requested bearer service.

5. The method according to claim 4, further comprising establishing a link between the network entity and the requesting downstream network entity for forwarding the packet stream of the requested bearer service, if the registration response message indicates that registration has been successful.

6. The method according to claim 4, further comprising:
transmitting by said network entity a registration request for said requested bearer service to an upstream network entity or the service center, if it has been determined that the packet stream of said requested bearer service is not received by the network entity, and receiving by said network entity a registration response message from the upstream network entity or the service center indicating whether registration of the said requested bearer service has been successful.

7. The method according to claim 6, further comprising establishing a link between the network entity and the upstream network entity or the service center for forwarding the packet stream of the requested bearer service, if the registration response message indicates that registration has been successful, and transmitting by said network entity a registration response message to the requesting downstream network entity indicating a successful registration of the requested bearer service.

8. The method according to claim 1, further comprising transmitting by said network entity a registration request for a bearer service to an upstream network entity or the service center, and receiving by said network entity a registration response message from the upstream network entity or the service center indicating whether registration of the requested bearer service has been successful.

9. The method according to claim 8, further comprising establishing a link between the requesting network entity and the upstream network entity or the service center for forwarding the packet stream of the requested bearer service, if the registration response message indicates that registration has been successful.

10. The method according to claim 6, further comprising updating by said network entity the service context maintained at the network entity based on the received registration response message.

11. The method according to claim 1, further comprising:
receiving by said network entity from a downstream network entity a deregistration request for a bearer service, releasing the link established for the bearer service between the requesting downstream network entity and the network entity, and updating by said network entity the service context to indicate that the stream of the bearer service is no longer forwarded to the requesting downstream network entity.

12. The method according to claim 11, further comprising:
determining by said network entity whether another downstream network entity other than the requesting downstream network entity maintains a link for the bearer service to the network entity, and if not, transmitting by said network entity a deregistration request for said bearer service to an upstream network entity or the service center.

13. The method according to claim 1, further comprising transmitting by said network entity a deregistration request for a bearer service to an upstream network entity or the service center; and updating by said network entity the service context to indicate that the stream of the bearer service is no longer forwarded downstream to a downstream network entity or a mobile terminal.

14. The method according to claim 1, wherein the received information indicates the quality-of-service attributes indicating the quality-of-service attributes of each of said plurality of packet streams and the quality-of-service attributes of combinations of packet streams.

15. The method according to claim 1, wherein the network entity is an entity of the radio access network having qualityof-service management functionality or an entity of the core network having quality-of-service management functionality.

16. The method according to claim 1, further comprising converting by said network entity a stream of at least one selected bearer service to a stream transmittable within the quality-of-service constraints obtained from the quality-of-service management function.

17. The method according to claim 16, wherein the conversion comprises at least one of converting the bit rate of the stream, converting the codec type, converting the spatial or temporal resolution, and converting from multiple-layered to single-layered streams and from constant bitrate to variable bitrate streams or vice versa.

18. A network entity via which a multicast or broadcast service is provided from a service center to a mobile terminal, wherein said multicast or broadcast service is provided in the form of a plurality of packet streams each being transported via a single bearer service, said network entity comprising:
   a service manager providing a quality-of-service management function,
   a receiver for receiving information indicating the bearer services belonging to the multicast or broadcast service and the quality-of-service attributes required by the packet streams transported by the bearer services or required by packet stream combinations thereof,
   a service context establishing unit for establishing a service context comprising the received information,
   a quality-of-service constraints obtaining unit for obtaining from the quality-of-service management function quality-of-service constraints indicating a quality-of-service available for downstream data transmission for each downstream interface of the network entity,
   a selecting unit for selecting based on the quality-of-service attributes stored in the service context those bearer services from said bearer services belonging to the multicast or broadcast service, the streams of which are transmittable within the obtained quality-of-service constraints,
   a selected bearer services establishing unit for establishing at least a part of the selected bearer services, wherein for each bearer service being established a link between the network entity and an upstream network entity is set up, and
   a transmission unit for forwarding the packet stream of each established bearer service via the respective link to the mobile terminal.

19. A mobile communication system comprising a service center, at least one mobile terminal receiving multicast or broadcast service and at least one network entity according to claim 18.

20. A non-transitory computer readable medium for storing instructions that, when executed by a processor, cause the processor to provide a multicast or broadcast service from a service center via at least one network entity to a mobile terminal, wherein said multicast or broadcast service is provided in the form of a plurality of packet streams each being transported via a single bearer service, said network entity comprising a service manager providing a quality-of-service management function, by:
   receiving information indicating the bearer services belonging to the multicast or broadcast service and the quality-of-service attributes required by the packet streams transported by the bearer services or required by packet stream combinations thereof, and establishing a service context comprising the received information,
   obtaining from the quality-of-service management function quality-of-service constraints indicating a quality-of-service available for downstream data transmission for each downstream interface of the network entity,
   selecting based on the quality-of-service attributes stored in the service context those bearer services from said bearer services belonging to the multicast or broadcast service, the streams of which are transmittable within the obtained quality-of-service constraints,
   establishing at least a part of the selected bearer services, wherein for each bearer service being established a link between the network entity and an upstream network entity is set up, and
   forwarding the packet stream of each established bearer service via the respective link to the mobile terminal.

21. The method according to claim 9, further comprising updating by said network entity the service context maintained at the network entity based on the received registration response message.

* * * * *